US012277171B2

(12) United States Patent
Mao et al.

(10) Patent No.: US 12,277,171 B2
(45) Date of Patent: Apr. 15, 2025

(54) VIDEO RETRIEVAL TECHNIQUES USING VIDEO CONTRASTIVE LEARNING

(71) Applicant: INTERNATIONAL BUSINESS MACHINES CORPORATION, Armonk, NY (US)

(72) Inventors: Xiao Xia Mao, Shanghai (CN); Wei Jun Zheng, Shanghai (CN); Shi Hui Gui, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 18/179,617

(22) Filed: Mar. 7, 2023

(65) Prior Publication Data
US 2024/0303272 A1    Sep. 12, 2024

(51) Int. Cl.
*G06V 20/70* (2022.01)
*G06F 16/78* (2019.01)
(Continued)

(52) U.S. Cl.
CPC .............. *G06F 16/78* (2019.01); *G06F 40/30* (2020.01); *G06V 10/761* (2022.01);
(Continued)

(58) Field of Classification Search
CPC ...... G06V 20/70; G06V 10/761; G06V 10/82; G06V 30/19093; G06V 10/774
(Continued)

(56) References Cited

U.S. PATENT DOCUMENTS 10,642,892 B2    5/2020    Xiao
2007/0255755 A1    11/2007    Zhang
(Continued)

FOREIGN PATENT DOCUMENTS

CN    114742018 A    7/2022
CN    115129934 A    9/2022
(Continued)

OTHER PUBLICATIONS

Arnab, et al., "ViViT: A Video Vision Transformer", arXiv:2103.15691v2 [cs.CV], Nov. 1, 2021, 14 pgs., <https://arxiv.org/pdf/2103.15691.pdf>.
(Continued)

*Primary Examiner* — Daquan Zhao
(74) *Attorney, Agent, or Firm* — Lily Neff

(57) ABSTRACT

A method, computer system, and a computer program product are provided for training a neural network for finding queried videos. Two pairs of video clips and associated text are obtained from a first dataset and a second dataset. The first dataset is used to train two video encoders by providing the video clips to the encoders as input and providing the outputs to a cosine similarity calculator. The second dataset is used to train a multi-mentor paradigm with two mentors. A first mentor and a second mentor are each provided the pair of textual data inputs. The first mentor provides a similarity value comparison, and the second mentor provides a word mover distance. Using the output from the multi-mentor paradigm and the encoders, a contrastive loss is calculated and used to provide contrastive learning of video features by differentiating similarity and dissimilarity of the video clips.

20 Claims, 5 Drawing Sheets

(51) Int. Cl.
G06F 40/30 (2020.01)
G06V 10/74 (2022.01)
G06V 10/774 (2022.01)
G06V 10/82 (2022.01)
G06V 30/19 (2022.01)

(52) U.S. Cl.
CPC ............ *G06V 10/774* (2022.01); *G06V 10/82* (2022.01); *G06V 20/70* (2022.01); *G06V 30/19093* (2022.01)

(58) Field of Classification Search
USPC .................................. 386/239, 248, 278, 326
See application file for complete search history.

(56) References Cited

U.S. PATENT DOCUMENTS

| | | | |
|---|---|---|---|
| 2020/0142928 A1 | 5/2020 | Mei | |
| 2020/0372066 A1* | 11/2020 | Saggi | G06N 20/00 |
| 2022/0309278 A1 | 9/2022 | Gan | |
| 2023/0281247 A1* | 9/2023 | Lee | G06V 10/82 382/305 |

FOREIGN PATENT DOCUMENTS

| | | |
|---|---|---|
| CN | 115408558 A | 11/2022 |
| RU | 2647696 C2 | 3/2018 |
| WO | 2017114388 A1 | 7/2017 |

OTHER PUBLICATIONS

Devlin, et al., "BERT: Pre-training of Deep Bidirectional Transformers for Language Understanding", arXiv:1810.04805v2 [cs.CL], May 24, 2019, 16 pgs., <https://arxiv.org/pdf/1810.04805.pdf>.

Google, "Google Images", Google.com, [accessed Jan. 13, 2023], 1 pg., Retrieved from the Internet: <https://images.google.com/?gws_rd=ssl>.

Reimers, et al., "Sentence-BERT: Sentence Embeddings Using Siamese BERT-Networks", arXiv:1908.10084v1 [cs.CL], Aug. 27, 2019, 11 pgs., <https://arxiv.org/pdf/1908.10084.pdf>.

Tolstikhin, et al., "MLP-Mixer: An all-MLP Architecture for Vision", arXiv:2105.01601v4 [cs.CV], Jun. 11, 2021, 16 pgs., <https://arxiv.org/pdf/2105.01601.pdf>.

Xu, et al., "VideoCLIP: Contrastive Pre-training for Zero-shot Video-Text Understanding", ACM, Proceedings of the 2021 Conference on Empirical Methods in Natural Language Processing, pp. 6787-6800, Nov. 7-11, 2021, <https://aclanthology.org/2021.emnlp-main.544.pdf>.

Yang, et al., "XLNet: Generalized Autoregressive Pretraining for Language Understanding", 33rd Conference on Neural Information Processing Systems (NeurIPS 2019), Vancouver, Canada, arXiv:1906.08237v2 [cs.CL], Jan. 2, 2020, 18 pgs., <https://arxiv.org/pdf/1906.08237.pdf>.

* cited by examiner

VIDEO RETRIEVAL TECHNIQUES USING VIDEO CONTRASTIVE LEARNING

BACKGROUND

The present invention relates generally to the field of data retrieval and management, and more particularly to techniques for providing video retrieval techniques using contrastive learning.

Many content distributors use video clips as an efficient way to provide information to their users. In addition, popularity of video distribution on social media platforms have contributed to the rise in global video market. Video content may be used in a variety of fields such as entertainment, news, digital marketing, education, and even technical product introductions. In addition, many video creators and distributors want better exposure to their content. The growing interest in distribution and consumption of content in video format, has led to the emergence of algorithm-based video recommendation on different platforms.

Algorithm based video recommendations, however, has many challenges. Conducting searches for retrieving video clips is difficult given the current art. Unfortunately, video-retrieval techniques are based on discrete video frames that impose limitations and hamper the search process.

SUMMARY

Embodiments of the present invention disclose a method, computer system, and a computer program product for training a neural network for finding and retrieving queried videos. Two pairs of video clips and associated text are obtained from a first dataset and a second dataset. The first dataset is used to train two video encoders by providing the video clips to the encoders as input and providing the outputs to a cosine similarity calculator. The second dataset is used to train a multi-mentor paradigm having at least two mentors. A first mentor and a second mentor are each provided the pair of textual data inputs. The first mentor provides a similarity value comparison, and the second mentor provides a word mover distance (WMD). Using the output from the multi-mentor paradigm and the encoders, a contrastive loss is calculated that is used to provide contrastive learning of video features by differentiating similarity and dissimilarity of the video clips.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
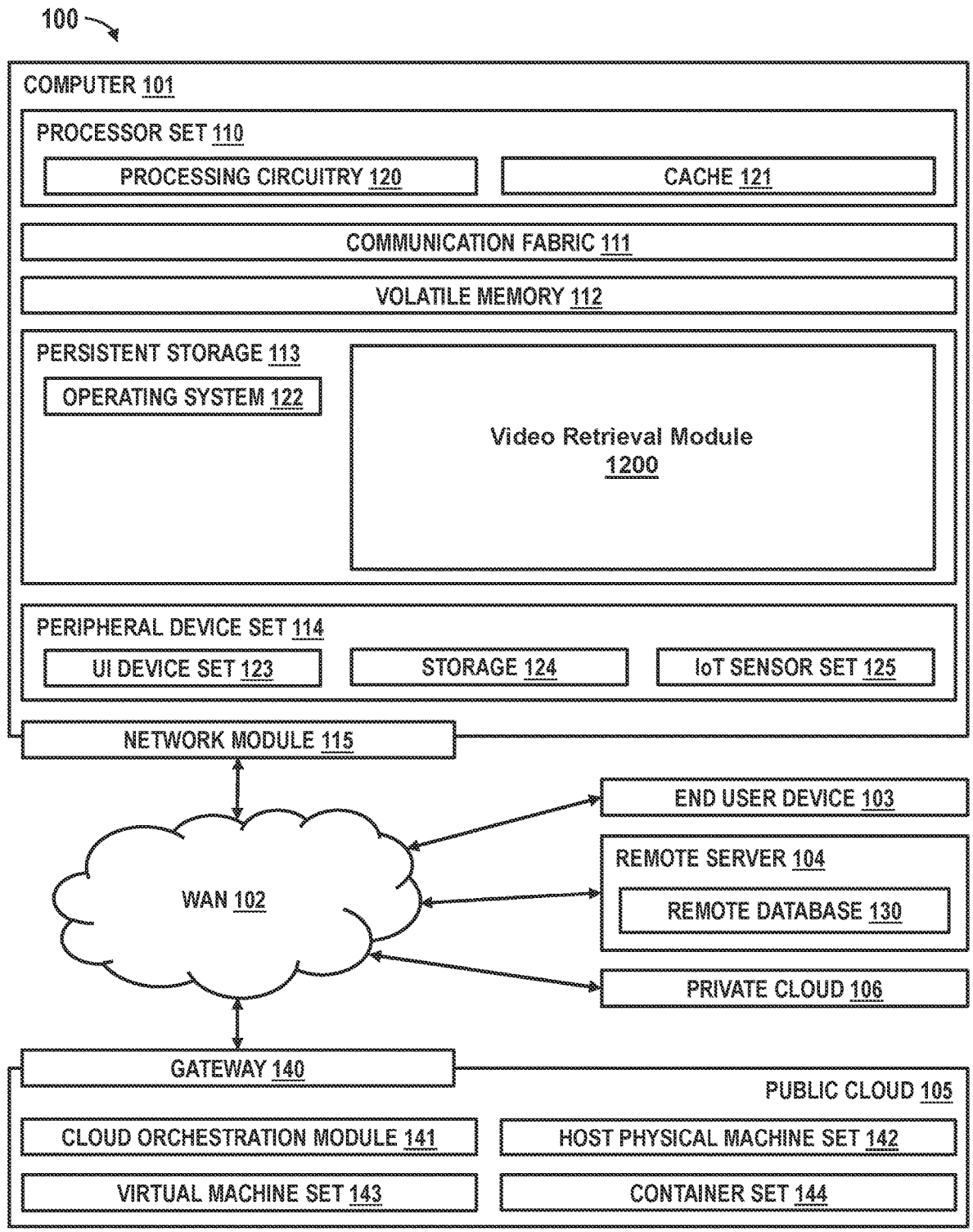
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as a video retrieval module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
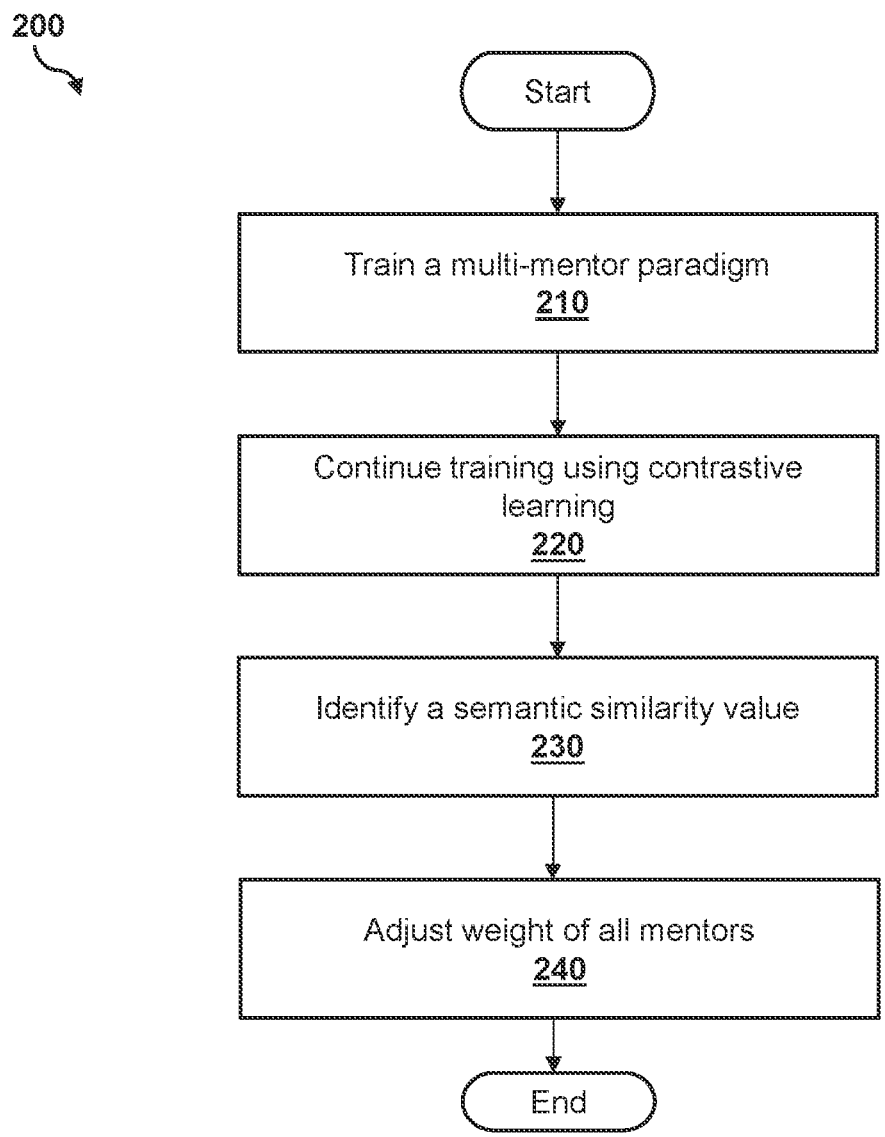
FIG. 2 provides an operational flowchart for providing a video search and retrieval technique, according to one embodiment.

FIG. 2 provides a flowchart depiction of one embodiment showing a process 200 to search and retrieve video clips using contrastive learning methods.

The growing popularity of videos as a form of content, shared across different platforms, has highlighted the current shortcomings of searching and retrieval of video clips. Part of the current limitations in this technology may be due to using discrete video frames. In the process 200, contrastive learning is used to remove some of these constraints.

Contrastive learning may be used as a self-supervised learning technique, especially when used with Artificial Intelligence (AI) engines that incorporate machine learning (ML) mod-els in the learning process. In one embodiment, the process self learns the common features between instances (e.g., images) of the same class and distinguishes the differences between instances of different classes. For example, in one embodiment, an encoder can be trained (through contrastive learning) to perform retrieval tasks optimally using a video clip as a query input. In FIG. 2, the process 200 provides for a method of text-guided video contrastive learning for training of a video encoder. However, as can be appreciated by those skilled in the art, the method does not have to be constrained to textual searches (provided here for ease of understanding) or be limited to a video encoder.

In Step 210, a training step may be performed to train a multi-mentor paradigm that coin-prises a Feedforward Network and at least two mentors (e.g., an adapted Siamese BERT-Network and the Word Mover's Distance algorithm. A BERT is a Bidirectional Encoder Representa-tion from Transforms). A mentor is a component that identifies a semantic similarity value between two input texts. In this embodiment, each mentor identifies the semantic value in a in different ways. This step may be better understood after the details provided in FIG. 4.

In Step 220, an additional training step may be performed by using contrastive learning. In this step, a video encoder, e.g., an MLP-Mixer based video encoder, may be used to encode one or more spatio-temporal tokens within an input video clip into a video feature vector. As was the case with the previous step, a better understanding of this step can be acquired after the discussion of some details in FIG. 4.

Step 230 identifies, by each mentor of the trained multi-mentor paradigm, a semantic similarity value based on two or more input texts. The input texts may be respectively overlapping on the timeline with two (or more) video clips that may be fed into at least two video encoders involved in the contrastive learning.

Step 240, dynamically adjusts, by the Feedforward Network of the trained multi-mentor paradigm, weights associated with all of the mentors. This allows for contribution to an ultimate training label for the contrastive learning.

Figure 3:
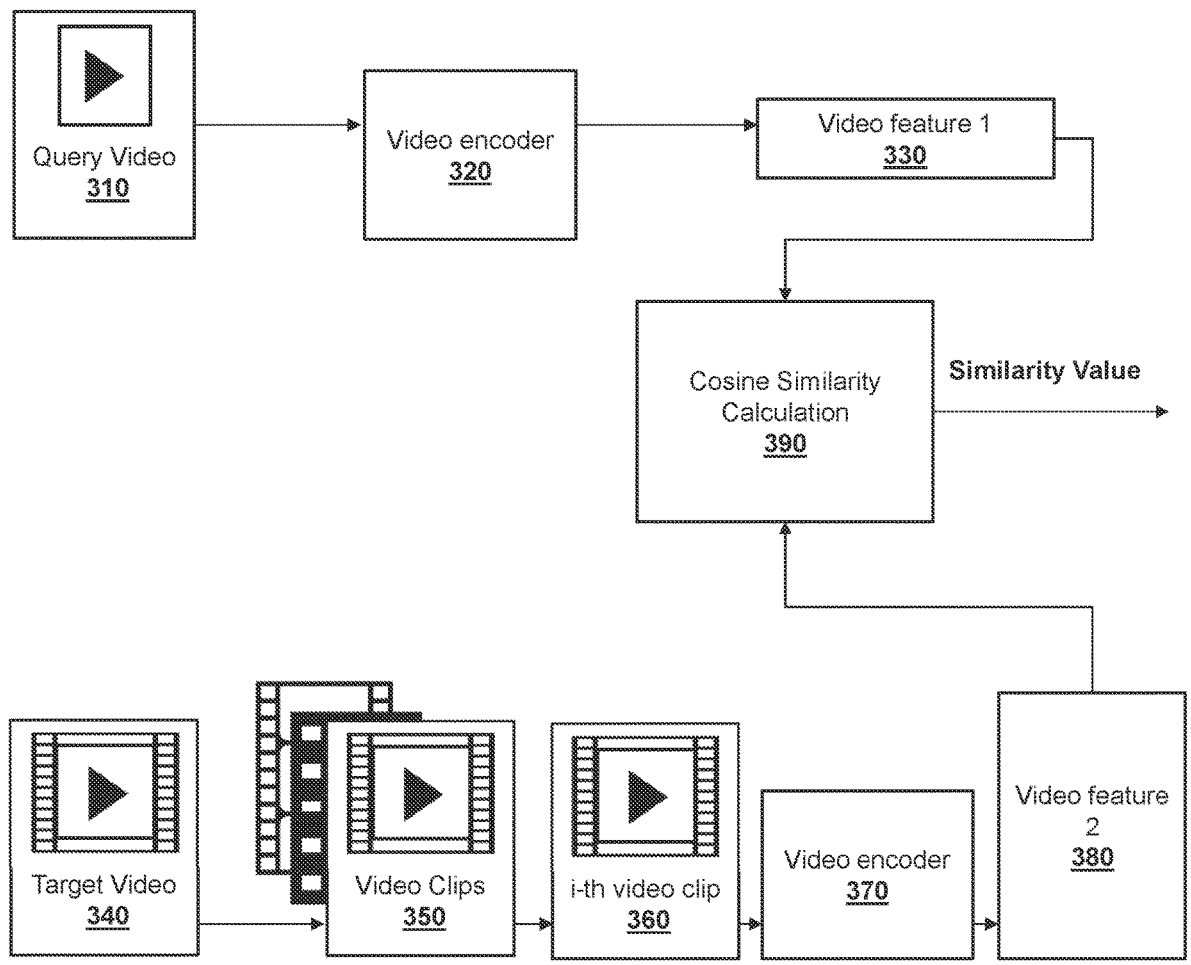
FIG. 3 provides a block diagram illustrates a video clip retrieval scenario using a trained video encoder, according to one embodiment.

FIG. 3 provides a block diagram showing video retrieval using a trained video encoder, according to one embodiment. After a video encoder is trained using the text-guided video contrastive learning of FIG. 2, the trained video encoder can be used to retrieve a video with a video as query. In this embodiment two video encoders have been used, as referenced by numerals 320 and 370 in FIG. 3. (In different embodiments this can be varied. For example, in one embodiment this can be a single trained encoder that can be used twice, or alternatively it may be two or more of the same trained video encoders that share/have the same model parameters.)

As discussed in Steps 210 and 220 of FIG. 2, video encoders may be trained for video retrieval using video as queries 310 that may be based on video features of spatio-temporal tubelets (instead of frames) within a video clip. In this embodiment, video encoder 1 at 320 encodes the query video 310 into a video feature vector (that is, video feature 1 at 330) and provide it to the cosine similarity calculator.

In the embodiment used as an example in FIG. 3, the duration of a query video is less than or equal to the maximum video clip duration (in this example, defined as 32 seconds). In one embodiment, the following steps may be used to search for videos from a video library (target video 340) which are most similar to the query video:

STEP 1: Take in a query video 310 provided by a user and retrieve a target video 340 from a video library.

STEP 2: Slice the target video 340 into sliced target-video clips (350 to 360) with the duration of the query video as the slice duration.

STEP 3: For each sliced target-video clip, starting from the first one, obtain the respective video feature vectors 380 for the current target-video clip and video feature vector 330 for the query video through the pretrained video encoders 320 and 370.

STEP 4: Calculate the similarity value between the two video feature vectors 330 and 380 by using the cosine similarity calculator 390.

STEP 5: If the similarity value between the query video and any target-video clip exceeds a preset threshold (e.g., 0.95), it indicates that the target video is similar to the query video. Otherwise, skip the current target video and repeat from STEP 1 again with next retrieved video from the library until videos from the library are all processed.

In other embodiment, wherein the duration of a query video is longer than the maximum video clip duration, both the query and target videos are sliced with the maximum video clip duration as the slice duration. If there are multiple successive target-video clips (considered as a se-quence, the total number of which is the same as the number of the query-video clips), and each cosine similarity between the video feature vectors of the query and target video clips with the same index number in respective clip sequences exceeds the preset threshold, then it indicates that the target video is similar to the query video.

Figure 4:
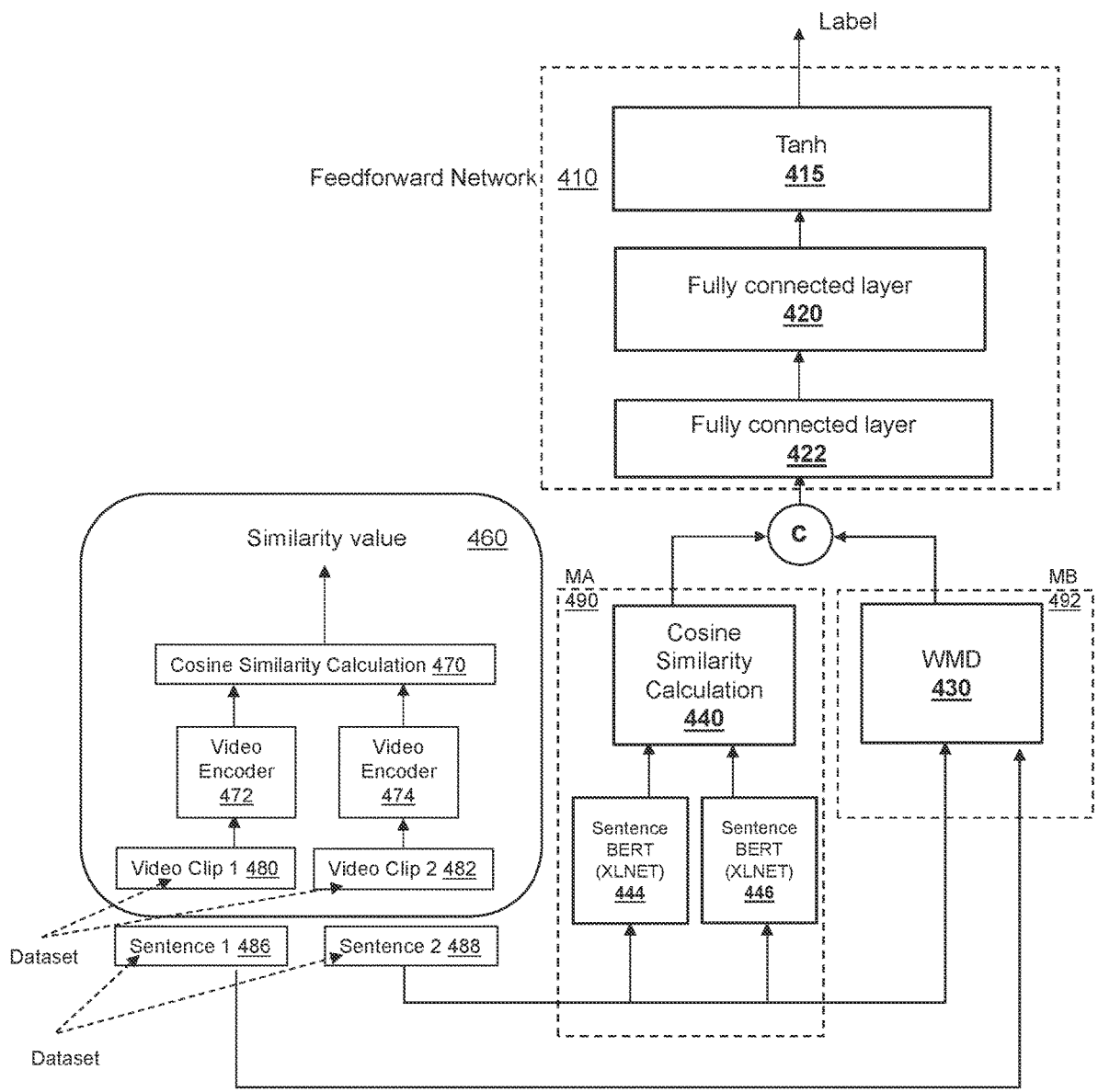
FIG. 4 illustrates a flow diagram for an implementation of a multi-mentor paradigm, according to one embodiment.

FIG. 4 illustrates a flow diagram for an implementation of a multi-mentor paradigm, according to one embodiment. For ease of understanding, FIG. 4 provides an example where for the contrastive learning of one or more video features as shown by the box 460, a Siamese Neural Network is used. In alternate embodiment, as can be appreciated by those skilled in the art other types may be used.

A Siamese neural network is an artificial neural network that uses the same weights to candidates, while working in tandem on two or more different input vectors to compute comparable output vectors. Often one of the output vectors is precomputed to provide a baseline to compare against the other output vector. This is described technically as a distance function for locality sensitive hashing.

In the example provided in FIG. 4, two video clips 480 and 482 are fed respectively into two video encoders (similar to encoders 320 and 370 in FIG. 3) as referenced by 472 and 474 whose parameters are shared. As can be seen from the dotted arrows, from the 1st dataset, video clip 1 (480), video clip 2 (482), sentence 1 (486) and sentence 2 (488) are obtained. Video clip 1 and sentence 1 are overlapping on a timeline; video clip 2 and sentence 2 are overlapping on a timeline. For box 460, the inputs are video clips 1 and 2. For the pre-trained multi-mentor paradigm at the right side of box 460, the inputs are sentences 1 and 2.

A cosine similarity calculator 470 (similar to 390 in FIG. 3) determines and compares values for two respective video feature vectors (V1 & V2) obtained from the two video encoders 480 and 482 as output. In most embodiments, there may not be a straightforward way to know in advance as whether the input video clips (here 480 and 482) can be treated as a positive/negative pair for contrastive learning purposes.

The rest of the process, except for what is marked by components of box 460, are used to enable a (text) guided video contrastive learning, which in this case is supported by a multi-mentor paradigm. A Feedforward Network is provided at 410, having a plurality (two here) of fully connected layers 420 and 422. An activation function (Tanh 415) is also used for the neural network.

As can be appreciated by those skilled in the art, an essential building block of a neural network is the activation function that decides whether a neuron will be activated or not. The activation functions are univariate and non-linear since a network with a linear activation function is equivalent to just a linear regression model. Due to the non-linearity of activation functions, neural networks can capture complex semantic structures and achieve high performance. Different types of activation functions can be used. In this embodiment a Tanh activation function is used that provides a tangent hyperbolic function: $f(x)=(e^x-e^{-x})/(e^x+e^{-x})$ In this case, two mentors MA (referenced as 490) and MB (referenced as 492) are provided. Each of the mentors identifies the similarity between two input texts from the perspective of text semantics in different ways. In one embodiment, mentor A 490 leverages adapted Siamese BERT-Networks (comprising Sentence-BERT 444/446), which replaces the underlying pretrained language model BERT with XLNET, and mentor B uses a Word Mover's Distance (WMD) 430 algorithm directly. More mentors than the ones shown in this example can exist in alternate embodiments and be similarly engaged in other embodiments.

Now looking back at FIG. 2 at Step 210, to train the multi-mentor paradigm with each positive/negative text pair as two inputs from the $2^{nd}$ training dataset, mentor A 490 may be fine-tuned and used to train the Feedforward Network. In one embodiment, this may be done together with the use of two mentors A and B (mentor A 490 may be frozen at this time), during which the cosine similarity from mentor A 490 and the distance calculated by mentor B may be concate-nated to form a 2-dimensional vector (the first dimension is the cosine similarity value, and the second dimension is the calculated distance value). The training label may be provided corresponding to a positive text pair as input is 1 and −1 for a negative text pair. Mean square error (MSE) loss is used in this embodiment to update the parameters of the Feedforward Network. The value range of the output from the whole multi-mentor paradigm is [−1, 1].

Secondly, to train the video encoder using contrastive learning as was mentioned in FIG. 2 at Step 220: each time, randomly select two (or more) pairs of video clip and associated text from the $1^{st}$ training dataset. The pair from the first dataset comprises one video clip and one associated text (e.g., a text sentence spoken by a human character showing in that video clip). The video clip and the text are overlapping on a timeline. As shown video clips (e.g., video clip 1 at 480 and video clip 2 at 482) are respectively fed into the two video encoders and the two paired text clips (sentence 1 at 486 and sentence 2 at 488) are fed into mentors A 490 and B 492 at the same time. Then, the output from the trained multi-mentor paradigm is used as the current training label and involved in the calculation of contrastive loss, together with the cosine similarity from the Siamese Neural Network comprising the two video encoders.

Figure 5:
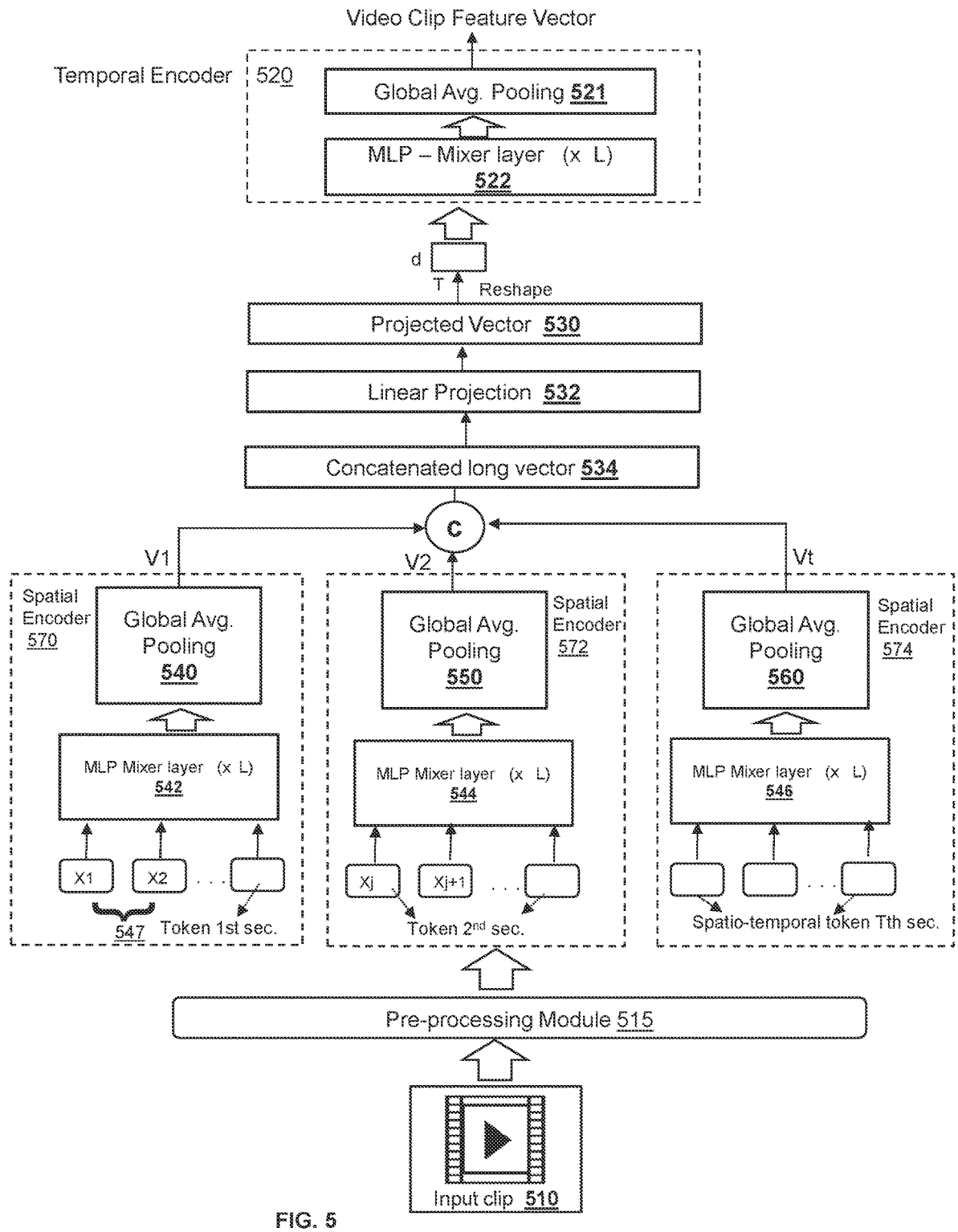
FIG. 5 provides a block diagram providing more details about a video encoder implementation, according to one embodiment.

FIG. 5 provides a block diagram providing a closer look at the video encoder implementation. In this embodiment, the input is provided as a video clip 510. The pre-processing module 515 will handle this input video clip 510. In one embodiment, this process may be conducted by dividing the input video clip 510 into smaller clips of small duration (e.g., 1 second). From within each small duration (one-second) clip, non-overlapping spatio-temporal tubelets are extracted on a one-by-one basis. Each spatio-temporal-tubelet will be embedded linearly to obtain a corresponding spatio-temporal token (e.g., X1, X2 . . . in FIG. 5).

In this embodiment, a video encoder is presented that can encode a video clip into a d-dimensional feature vector, based on spatio-temporal tubelets (instead of video frames) within the input video clip. In this embodiment, the video encoder uses Multi-Layer Perception (MLP)—Mixer (an all-Multi-Layer Perceptions architecture) layers, instead of a Convolutional Neural Networks or Transformer. In this example, the video encoder mainly comprises one or more spatial encoder(s)—570-574—and a temporal encoder 510. The temporal encoder is composed of L MLP-Mixer layers as shown at 522.

The MLP-Mixer layers for the spatial encoder are shown at 542-546, wherein there are L MLP-Mixer layers. The first MLP Mixer layer of the spatial or temporal encoder takes in as input multiple vectors with the same dimension, and then the output vectors from the last MLP-Mixer layer are processed through global average pooling in order to obtain a final feature vector.

For an input video clip (duration ≤32 seconds where 32 is the preset maximum video clip duration), the spatio-temporal tokens at each second are sequentially fed into the spatial encoder in one shot so as to obtain a spatial feature vector (e.g., $v_1$ in FIG. 5) for the corresponding second. The tokens or the tubelet embeddings are extracted and linearly embedded (non-overlapping tubelets that span the spatio-temporal input volume). This is reflected, for example as $x_1$, $x_2$, etc. in FIG. 5 at 547.

After the spatial feature vector of each input video clip's second (that is, $v_1$, $v_2$, . . . , $v_{\mathcal{T}}$) has been obtained, concatenate sequentially all spatial feature vectors into a long vector 534, which is linearly projected to a vector 530 with size $1 \times (\mathcal{T}*d)$ and then reshaped into $\mathcal{T}$ d-dimensional vectors (can be considered as a two-dimensional table with height $\mathcal{T}$ and width d), where $\mathcal{T}$ is equal to the maximum video clip duration. Those $\mathcal{T}$ reshaped vectors are sequentially fed into the temporal encoder simultaneously to obtain the final video-clip feature vector.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training a neural network for finding and retrieving queried videos, comprising:
   obtaining two video clips from a first dataset and providing the two video clips to two video encoders for training;
   providing an output of each of the two video encoders to a cosine similarity calculator;
   training a multi-mentor paradigm having at least two mentors by obtaining two textual inputs from a second dataset, wherein a first mentor is provided each textual input to provide a similarity value comparison and a second mentor is provided said two textual inputs to provide a word mover distance (WMD); and using said output from said multi-mentor paradigm and said encoders, calculate a contrastive loss used to provide contrastive learning of video features for differentiating similarity and dissimilarity of video clips.

2. The method of claim 1, wherein said first dataset comprises pairs of video and text clips that are overlapping on a timeline.

3. The method of claim 1, wherein said first dataset is used to construct a positive video and text pair for contrastive learning.

4. The method of claim 1, wherein said second dataset comprises a corpus having pairs of substantially similar texts.

5. The method of claim 4, wherein said corpus can include an online or an offline document.

6. The method of claim 1, wherein said first and second mentor each identify a similarity between said two inputted texts from a perspective of text semantics.

7. The method of claim 1, wherein said multi-mentor paradigm has a feedforward network with multiple layers, and said feedforward network combines a plurality of outputs from all mentors in order to generate a label.

8. The method of claim 1, wherein said encoders use spatio-temporal tokens within each video to provide a video feature vector used in said cosine similarity calculator.

9. The method of claim 1, wherein said encoders are part of a Siamese neural network.

10. The method of claim 9, wherein a same weight is given to video clips provided to said encoders to compute a comparable output vector.

11. The method of claim 10, wherein said weights are adjusted during said training.

12. The method of claim 1, wherein said neural network is used to find and retrieve a queried video from a corpus based on a search request.

13. A computer system for training a neural network to find and retrieve queried videos, comprising:

one or more non-transitory computer readable storage media storing program instruction to be executed by a processor;

program instructions, stored on at least one of the one or more non-transitory computer-readable storage media for execution by at least one of the one or more processors via at least one of the one or more memories to update, wherein the computer system is enabled to perform the steps:

obtaining two video clips from a first dataset and providing it to two video encoders for training;

providing an output of each encoder and providing it to a cosine similarity calculator;

training a multi-mentor paradigm having at least two mentors by obtaining two textual inputs from a second dataset; wherein a first mentor is provided each textual input to provide a similarity value comparison and said second mentor is provided two textual inputs to provide a word mover distance (WMD);

using said output from said multi-mentor paradigm and said encoders, calculate a contrastive loss used to provide contrastive learning of video features for differentiating similarity and dissimilarity of video clips.

14. The computer system of claim 13, wherein said first dataset comprises pairs of video and text clips that are overlapping on a timeline and said second dataset comprises a corpus having pairs of substantially similar texts.

15. The computer system of claim 13, wherein said first and second mentor each identify similarity between said two inputted texts from a perspective of text semantics.

16. The computer system of claim 13, wherein said multi-mentor paradigm have a feedforward network with multiple layers and said feedforward network combines a plurality of outputs from all mentors in order to generate a label.

17. A computer program product for training a neural network for finding and retrieving queried videos, comprising:

one or more non-transitory computer readable storage media storing program instruction to be executed by a processor;

program instructions, stored on at least one of the one or more non-transitory computer-readable storage media, to update the program instructions comprising:

obtaining two video clips from a first dataset and providing it to two video encoders for training;

providing an output of each encoder and providing it to a cosine similarity calculator;

training a multi-mentor paradigm having at least two mentors by obtaining two textual inputs from a second dataset; wherein a first mentor is provided each textual input to provide a similarity value comparison and said second mentor is provided said two textual inputs to provide a word mover distance (WMD);

using said output from said multi-mentor paradigm and said encoders, calculate a contrastive loss used to provide contrastive learning of video features for differentiating similarity and dissimilarity of video clips.

18. The computer program product of claim 17, wherein said first dataset comprises pairs of video and text clips that are overlapping on a timeline and said second dataset comprises a corpus having pairs of substantially similar texts.

19. The computer program product of claim 17, wherein said first and second mentor each identify similarity between said two inputted texts from a perspective of text semantics.

20. The computer program product of claim 17, wherein said multi-mentor paradigm have a feedforward network with multiple layers, and said feedforward network combines a plurality of outputs from all mentors in order to generate a label.

* * * * *